Oct. 26, 1954     T. S. JESSUP     2,692,544
ROOT PLOW

Filed May 23, 1949     2 Sheets-Sheet 1

Inventor
Thomas S. Jessup

By Clarence A. O'Brien
and Harvey B. Jacobson
Attorneys

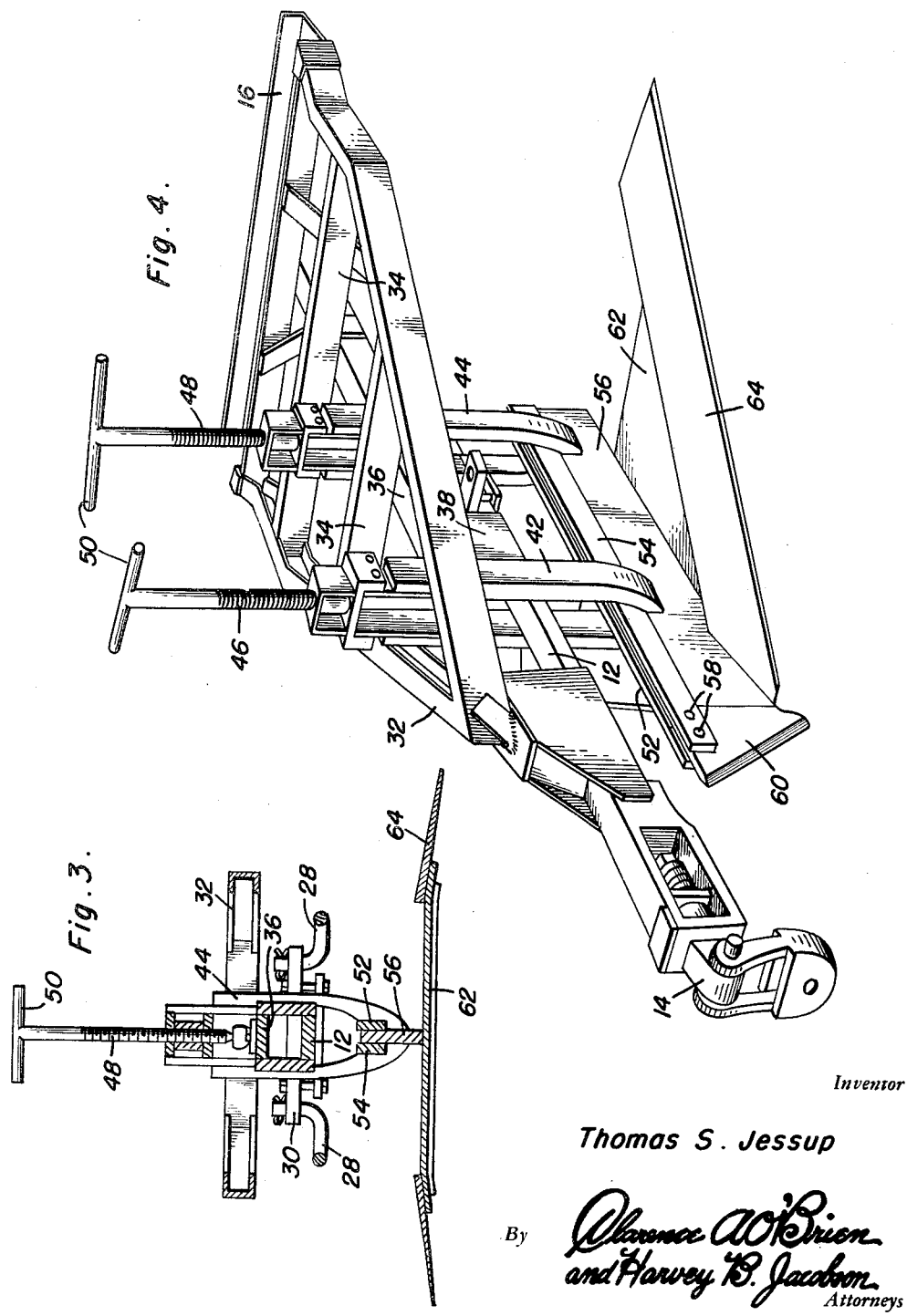

Patented Oct. 26, 1954

2,692,544

UNITED STATES PATENT OFFICE 2,692,544

ROOT PLOW

Thomas S. Jessup, Arcadia, Fla., assignor to Fleco Corporation, a corporation of Florida Application May 23, 1949, Serial No. 94,828

1 Claim. (Cl. 97—226.1)

This invention relates to a root plow and more particularly to a plow of the type employed for clearing land infested with plant life having creeping caudices. In certain areas of the country, the ground is infested with growths of the type having creeping caudices which lie along or close to the surface of the ground and project roots into the ground so that such caudices become anchored very firmly and are extremely resistant to displacement by ordinary means. Where such growths are permitted to grow unhampered, the caudices criss-cross one another and form a veritable net work adjacent the surface of the ground which not only chokes out other plant life but offers a great deal of resistance to its removal by ordinary methods.

Various types of root plows have been proposed, such as those disclosed in Patents 1,142,503; 1,143,204; 1,578,931 and 2,230,850, and while such plows have in a measure served their purpose, owing to the fact that no means is provided for positively holding the plow blades in proper position for severing the roots from their caudices, some difficulty has been experienced in retaining the plow blades at the proper depth beneath the surface of the ground, particularly when rough surfaces or obstacles are encountered.

The primary object of this invention is to assist in maintaining the plow blades at the proper depth beneath the surface of the ground to sever the roots of plant growth, such as palmetto and the like.

Another object is to loosen and break up the soil from which the caudices have been severed to expose the root growth and facilitate its rapid removal from the soil.

The above and other objects may be attained by employing this invention which embodies among its features a guide blade, a pair of horizontal converging root severing blades carried by the guide blade, a vertically extending caudex severing blade carried by the guide blade at the convergent ends of the converging blades, means connected to the blades for advancing said blades in a horizontal path with the convergent ends thereof foremost, and spaced groups of harrow disks mounted on the blade advancing means for rotation about horizontal axes behind the blades, said disks cooperating with the guide blade in holding the plow to a predetermined course.

Other features include means carried by the harrow disks for adjusting the convergent blades vertically, properly to position them the right distance beneath the surface being treated.

Still other features include retaining the harrow disks at an angle to the direction of travel of the plow which will best regulate the depth to which the divergent plow blades enter the earth.

In the drawings:

Figure 3 is a transverse sectional view taken substantially along the line 3—3 of Figure 2; and Figure 4 is a perspective view of the root plow illustrated in Figure 1 with the harrow disks omitted.

Figure 1:
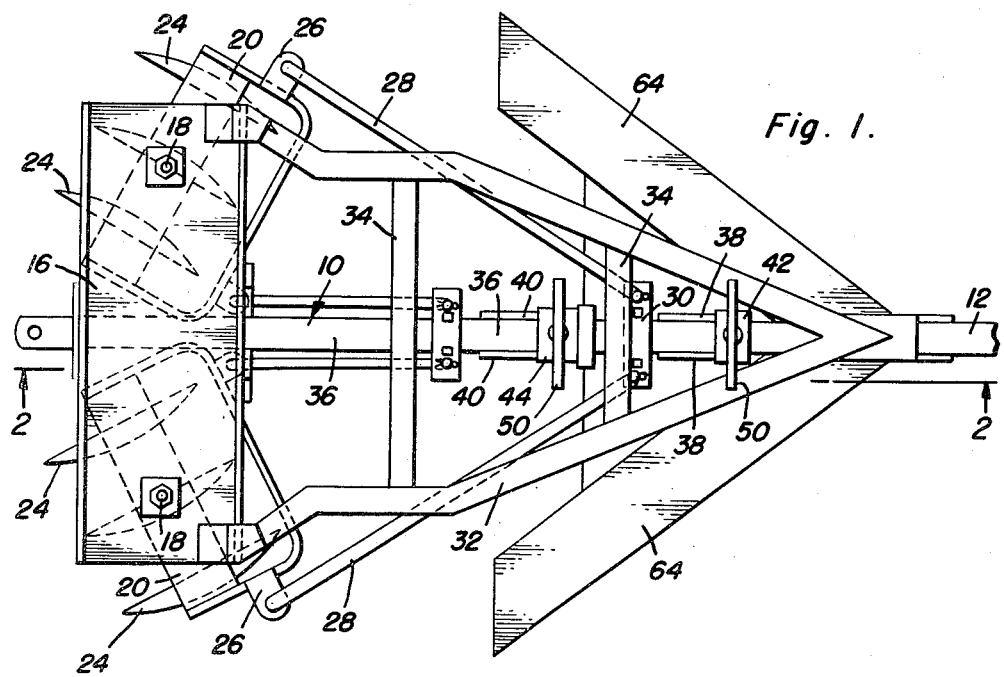
Figure 1 is a top plan view of a root plow embodying the features of this invention.
Figure 2:
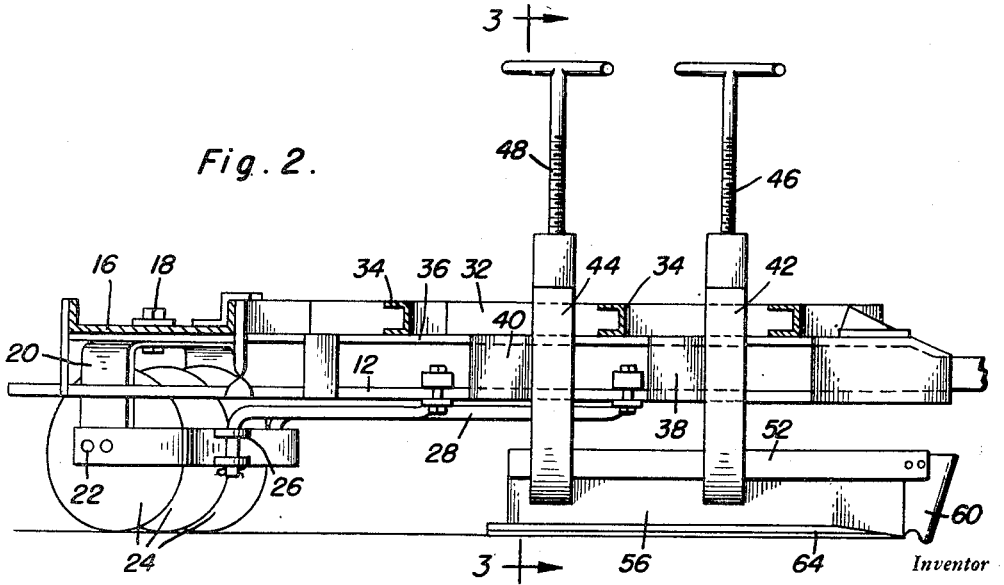
Figure 2 is a longitudinal sectional view taken substantially along the line 2—2 of Figure 1.

In the preferred embodiment of the invention I employ a conventional heavy duty plowing harrow designated generally 10 of a type commonly employed in highway construction. Such a harrow comprises a conventional draw bar 12 comprising an elongated body member carrying at one end a conventional clevis 14. Fixed to the draw bar 12 adjacent the end remote from the clevis 14 is a cross bar 16 which in the present form of the invention comprises a channel member, with the flanges thereof turned upwardly. A vertically extending pivot 18 projects through the web portion of the cross bar 16 adjacent each end thereof and supports at its lower end a conventional inverted U-shaped yoke 20 in which the axle shafts 22 are mounted. A group of harrow disks 24 are mounted for rotation on each axle shaft 22, and the yokes 20 are arranged to swivel about the axes of the pivot bolts 18 into various positions in horizontal arcs which lie concentric about the axes of the pivot bolts. Extending outwardly from each yoke 20 is an ear 26 which is pierced to receive one end of a radius rod 28, the opposite end of which is coupled to a block 30 carried by the draw bar 12 between the clevis 14 and the cross bar 16. Blocks 30 slide on draw bar 12 and the bolts clamping blocks 30 are loosened to allow any degree of setting to be obtained, so that the disks may be adjusted to suit differing conditions of the land being treated. As previously explained, the harrow just described is of the conventional heavy duty type employed in road construction, and while the harrow forms an important component of this invention, the specific type of disk harrow used may vary so long as its function in connection with this invention is not in any way impaired.

In carrying my invention into practice I attach to a harrow of the type just described a substantially V-shaped frame 32, the divergent end of which is coupled in any convenient manner to the cross beam 16 adjacent opposite ends thereof, while the apex of the frame 32 is disposed above the draw bar 12 near the end carrying the clevis 14. The frame 32 is provided intermediate its ends with transversely extending cross bars 34, and extending rearwardly from the apex of the V-shaped frame 32 in spaced parallel relation to the draw bar 12 is a secondary draw bar 36 which lies in vertically spaced parallel relation to the draw bar 12. Fixed to opposite side edges of the draw bars 12 and 36 are longitudinally spaced pairs of guide plates 38 and 40, and mounted for vertically sliding movement on the draw bars 12 and 36 adjacent the guide plates 38 and 40 respectively are inverted U-shaped yokes 42 and 44, the legs of which straddle the draw bars as will be readily understood upon reference to Figure 4. Threadedly entering the upper ends of the inverted U-shaped yokes 42 and 44 respectively are adjusting screws 46 and 48 the lower ends of which rest on the top face of the upper draw bar 36 in order adjustably to support the yokes 42 and 44 thereon. The upper ends of the screws 46 and 48 are provided with cross handles 50 by which they may be turned to raise or lower their respective yokes. Secured in any suitable manner to the lower ends of the legs of the yokes 42 and 44 on each side of the longitudinal axis of the plow are supporting bars 52 and 54 respectively between which is secured in any suitable manner a vertical guide blade 56, and detachably coupled as by bolts 58 to the supporting bars 52 and 54 adjacent the ends thereof nearest the clevis 14 is a vertically disposed caudex cutting blade 60. Fixed to the lower edge of the guide blade 56 is a triangular-shaped horizontally disposed plate 62 to opposite side edges of which are detachably connected in any conventional manner horizontal root severing blades 64 which converge adjacent the rear edge of the blade 60 and are provided along their outer edges with sharpened cutting edges. The forward convergent ends of the blades 64 are located substantially directly below the apex of the frame 32.

In use the plow is coupled to any suitable traction vehicle by means of the clevis 14 so that as the traction vehicle advances, the blade 60 encountering transversely extending caudices will sever them while the blades 64 will travel closely beneath the under sides of the caudices and sever them from any roots that they may have put out. In this way the matting of the caudices does not present a serious obstacle to the removal of them from the ground, and the severing of the roots from the caudices enables them to be easily and quickly removed from the surface being treated. As the severing of the caudices and the severing of the roots from the caudices progresses, it is obvious that the disks 24 will cooperate with the blade 56 in maintaining the blades at the proper depth below the surface of the ground and in holding the course of the plow. Obviously, by adjusting the screws 46 and 48, the blades 56, 60 and 64 may be tilted to various angles with relation to the draw bars 12 and 36 so that where conditions demand the convergent ends of the blades 64 may be caused to enter the earth by tilting the forward end of the blade 56 downwardly. Owing to the angular engagement of the disks 24 with the surface being traversed, it is obvious that a certain amount of downward drag may be imparted to the draw bars 12 and 36 in order to aid in holding the blades 60 and 64 at the proper depth.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a root plow of the type employed for clearing land infested with plant life having creeping caudices, said root plow comprising a supporting frame including an elongated drawbar, longitudinally spaced hangers carried by said drawbar, said hangers each including a depending yoke including an upper central portion and depending legs, an adjusting screw threadedly engaged with said upper central portion, said screw being rockably carried by said drawbar, said yoke straddling said drawbar with said legs having lower ends depending below said drawbar on opposite sides thereof, a longitudinally extending, vertically disposed guide blade disposed in vertical alignment with said drawbar, means securing said lower ends of the legs of the yokes to opposite sides of said guide blade in supporting relation, said guide blade having a lower edge, a flat, generally triangular guide plate secured to the lower edge of said guide blade normal normal to the plane of said guide blade, said guide plate having rearwardly diverging edge portions, said rearwardly diverging edge portions sloping slightly outwardly and downwardly, rearwardly diverging root severing blades carried by said rearwardly diverging edge portions and forming outwardly directed extensions thereof, said root severing blades intersecting in an apex, a caudex cutting blade carried at a forward end of said guide blade in alignment therewith, said caudex cutting blade being disposed in advance of said apex, said guide blade, said guide plate, said rooting severing blades and said caudex cutting blade being vertically adjustable as a unit through the adjustable positioning of said yokes by said screws.

References Cited in the file of this patent
UNITED STATES PATENTS

| Number | Name | Date |
| --- | --- | --- |
| 534,266 | Ivins et al. | Feb. 19, 1895 |
| 847,036 | Williams | Mar. 12, 1907 |
| 1,072,455 | Hendricks | Sept. 9, 1913 |
| 1,169,127 | Craddock | Jan. 25, 1916 |
| 1,459,256 | Ramirez | June 19, 1923 |
| 1,605,705 | Burkhalter | Nov. 2, 1926 |
| 1,689,452 | Phillips | Oct. 30, 1928 |
| 1,949,059 | LeTourneau | Feb. 27, 1934 |
| 2,337,777 | Seaholm | Dec. 28, 1943 |
| 2,385,637 | Mitchell et al. | Sept. 25, 1945 |